Nov. 18, 1969  V. C. JONES  3,478,698

ACCELERATION CONTROL MECHANISM

Filed Sept. 18, 1967  4 Sheets-Sheet 1

INVENTOR.
VERCOE C. JONES
BY
Merchant, Merchant + Gould
ATTORNEYS

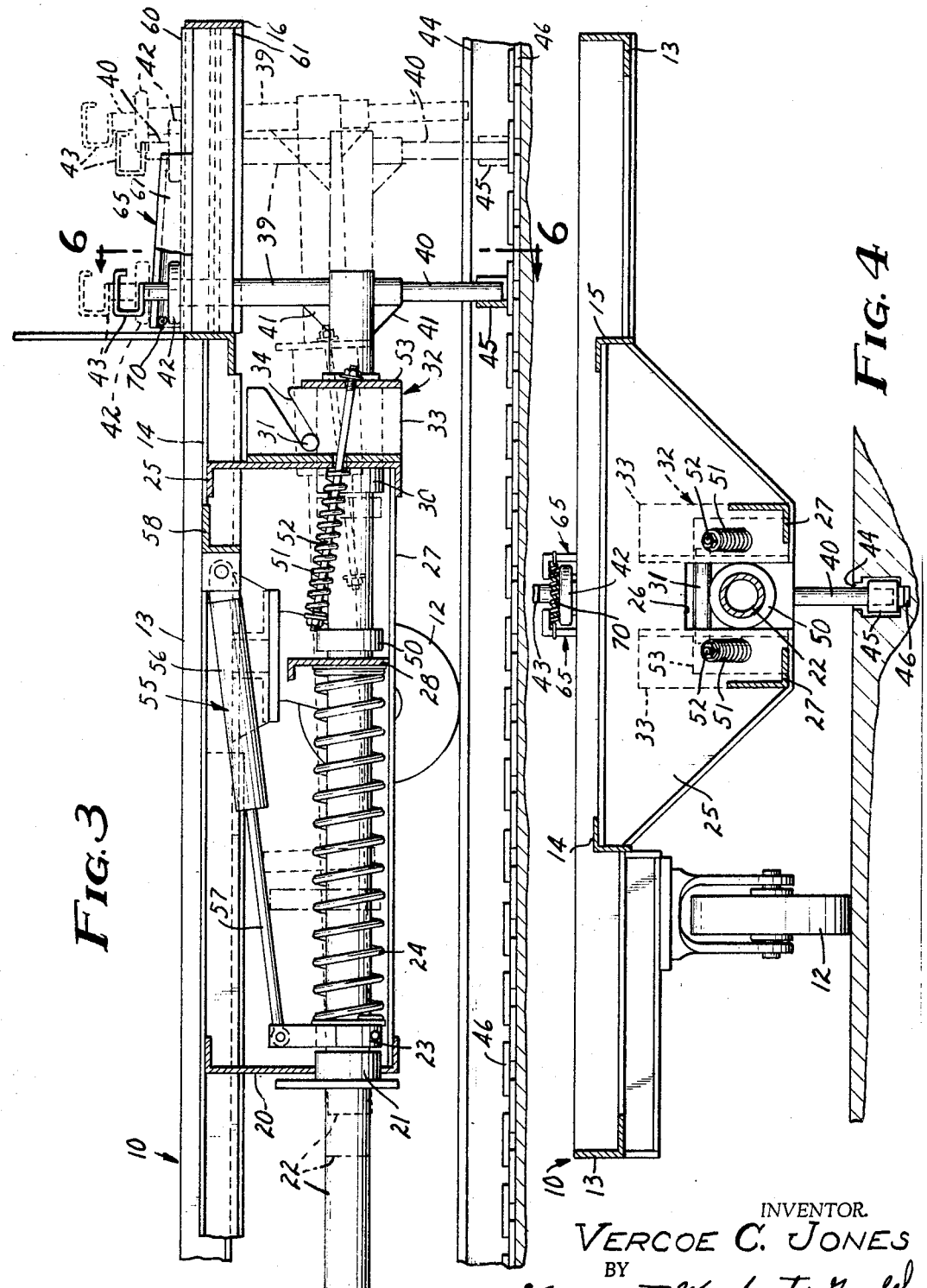

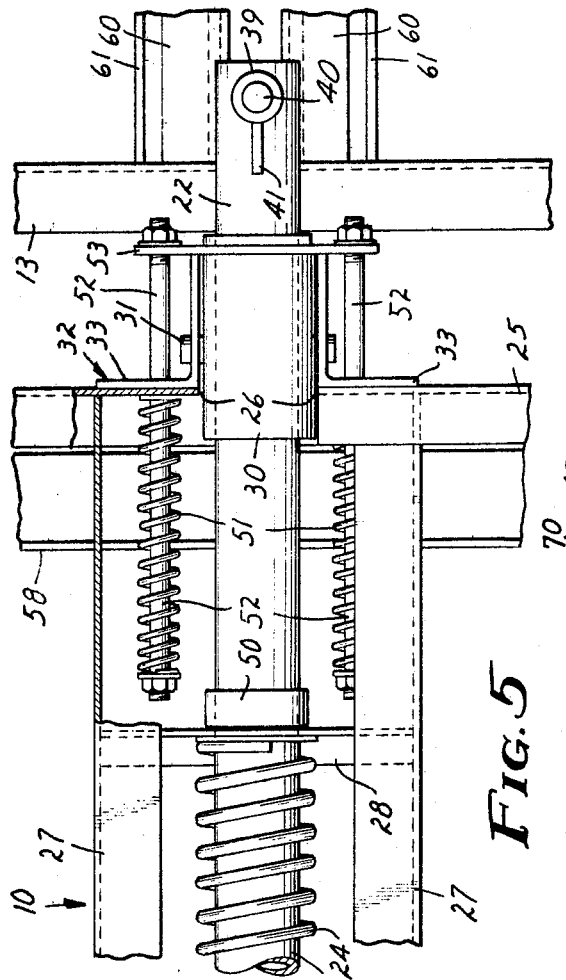
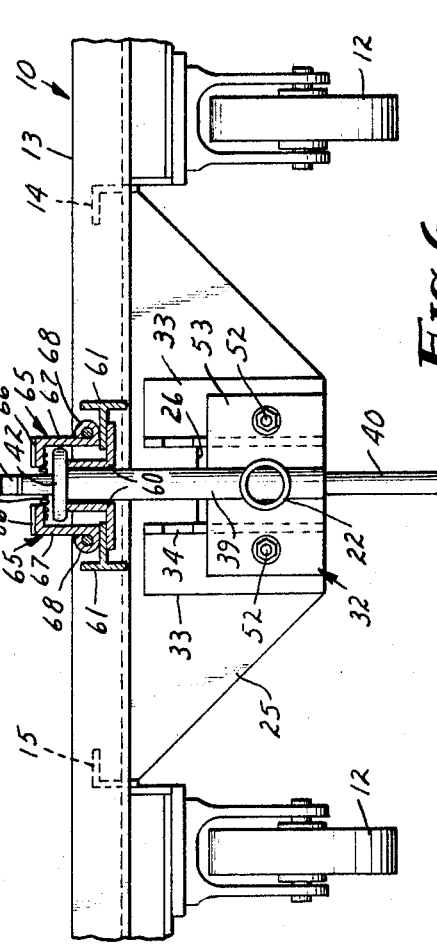
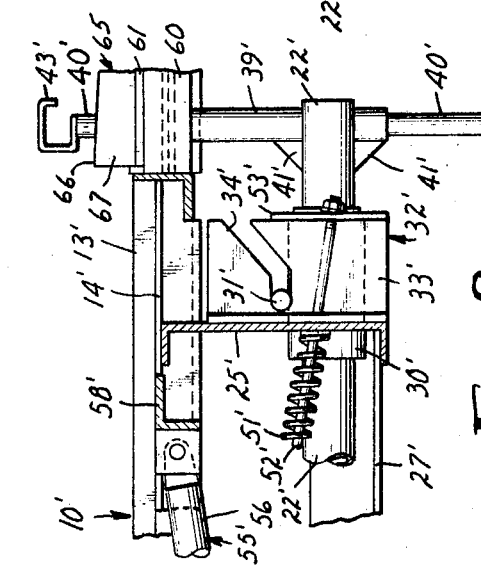
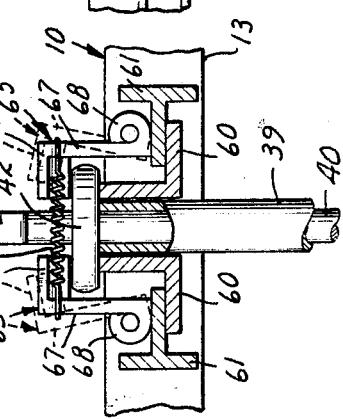

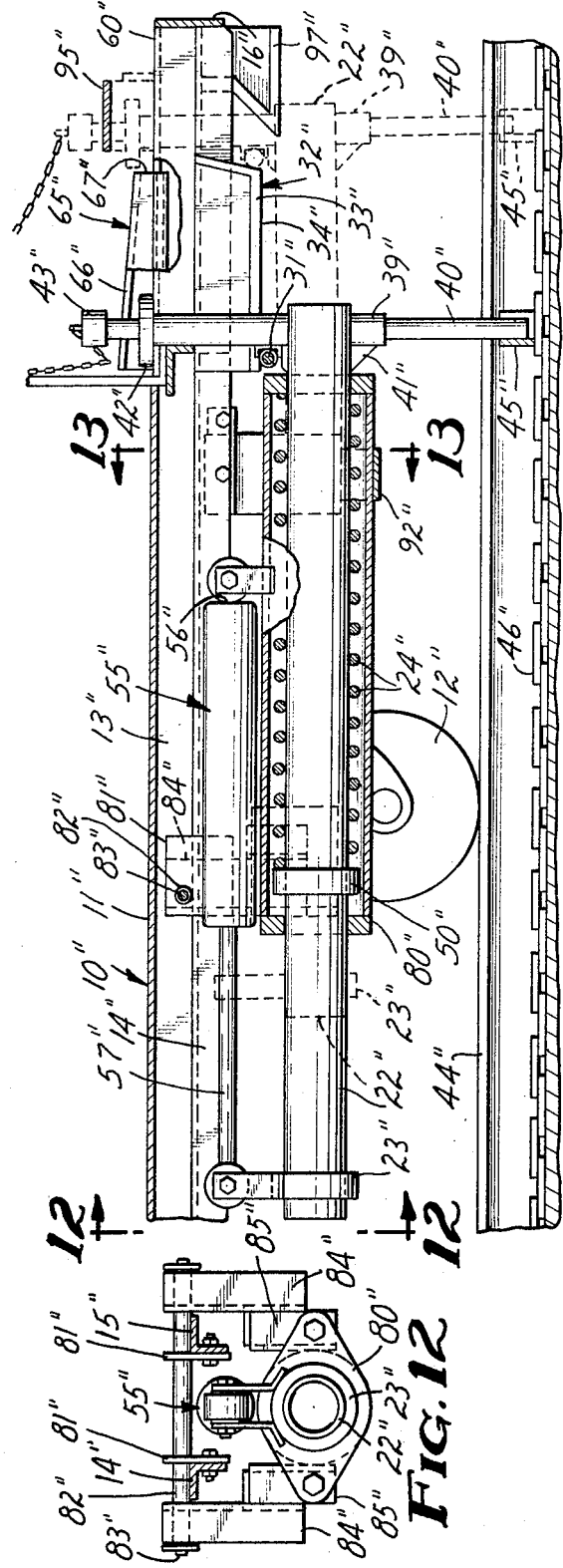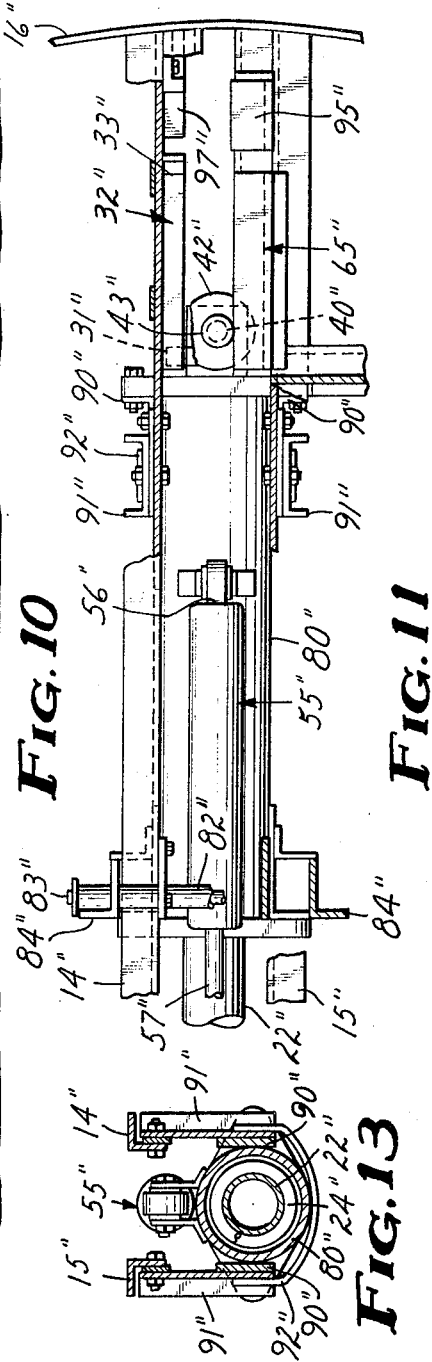

United States Patent Office

3,478,698
Patented Nov. 18, 1969

3,478,698
ACCELERATION CONTROL MECHANISM
Vercoe C. Jones, Faribault, Minn., assignor to Nutting Truck and Caster Company, Faribault, Minn., a corporation of Minnesota
Continuation-in-part of application Ser. No. 479,464, Aug. 13, 1965. This application Sept. 18, 1967, Ser. No. 683,041
Int. Cl. B61b 13/04, 7/10
U.S. Cl. 104—172    17 Claims

ABSTRACT OF THE DISCLOSURE

An elongated cylinder mounted generally horizontally below a materials handling truck for longitudinal sliding movement in the direction of movement of the truck, and attached to the truck for pivotal movements about a horizontal axis adjacent the rear portion of the cylinder and perpendicular to the longitudinal movement thereof and for substantial vertical movement of the front end of the cylinder. A tow pin attached adjacent the front end of the cylinder in a generally vertical configuration for engaging dogs in an endless belt, and a generally horizontal bar attached to the cylinder generally perpendicular to the longitudinal axis thereof. A generally ramp-like structure affixed to the underside of the truck having the horizontal bar in sliding engagement therewith and controlling the vertical movement of the cylinder so as to allow vertical upward movement thereof and consequent disengagement of the tow pin and the dog after a predetermined amount of horizontal movement of the longitudinal cylinder. Spring biasing means cooperating with the cylinder to urge the cylinder toward a first position in which the tow pin is engaged in a dog, and a hydraulic cylinder allowing the cylinder and tow pin to return gradually to the first position after the tow pin and cylinder have moved out of the first position toward the disengaged position.

Related applications

This application is in the nature of a continuation-in-part of my application for U.S. Letters Patent, filed Aug. 13, 1965, Ser. No. 479,464, now abandoned, and entitled "Acceleration Control Mechanism," and relates to the structure disclosed and claimed in said prior application in addition to other modifications of said structure.

Background of the invention

In much of the industry today and especially in large manufacturing plants and the like, materials are moved from place to place by means of trucks which depend upon drag lines, located overhead or under the floor, for their motivating power. These drag lines are on the order of endless belts, cables or chains which are continuously moving at a constant speed. In general the trucks are connected to the drag line by means of a tow pin which, in prior art devices, is attached to the truck in a manner to allow only limited vertical movement and substantially no horizontal movement. In operation the truck is placed in a proper position relative to the drag line and the tow pin is manually engaged with the drag line whereupon the truck immediately moves away at the speed of the drag line. This substantially instant acceleration of the truck causes a shifting of the load thereon with in many cases subsequent damage to the load.

In many installations today, the tow line has spur lines where trucks are diverted for various purposes such as loading the material being handled into over-the-trucks, freight cars, etc., or storage in bins, etc. Many of these spur lines are nonpowered, i.e., have no drag line underneath. In these cases, the tow pin of the truck being diverted is switched into the start of the spur line at which time the truck stops. The succeeding truck must push the switched truck completely into the spur line, clear of the main drag line. The force of accelerating the truck or trucks at rest in the spur line by the truck traveling on the main drag line becomes sufficient to damage the pushing truck if its tow pin is rigidly attached to the truck. This force is proportional to the square of the velocity of the drag line. As a result, the system speeds have been limited to approximately 90 f.p.m.

Summary of the invention

This invention pertains to acceleration control mechanism on a materials handling truck adapted for movement with a drag line or the like and more particularly to acceleration control mechanism which accelerates the truck gradually upon connection with the drag line and automatically disconnects the truck from the drag line if the acceleration of the truck is below a predetermined value.

In the present invention the tow pin is not connected rigidly to the truck but instead is allowed to move horizontally along the axis of movement of the truck a predetermined distance. The tow pin also moves vertically a distance sufficient to disengage it from the drag line in the event that it moves substantially the entire allowable horizontal distance before the truck accelerates to the speed of the drag line or the truck strikes an object, such as stationary trucks, which greatly impedes acceleration. Means are associated with the pin in a manner to absorb the initial accelerating shock and to provide a bias which tends to maintain the tow pin in its drag line engaging position. Also, when a truck having the present invention thereon runs into a car or cars stopped at a spur line the forces at impact, due to the resistance of the trucks at rest and the tremendous forces that can be exerted by the tow line through the tow pin on the truck doing the pushing, are greatly reduced as energy is absorbed in the mechanism, cushioning the impact and accelerating the trucks gradually. This reduction in forces permits the drag line to be operated at speeds higher than heretofore permissible.

Thus, when the tow pin of a truck containing the present invention is engaged with a drag line, the truck accelerates gradually to the speed of the drag line and in the event that the acceleration of the truck is too slow, due to an extremely heavy load, meeting an obstacle in its path, or the like, the tow pin disengages from the drag line automatically. The present invention also has apparatus associated with the tow pin for maintaining the tow pin disengaged from the drag line once it is automatically or manually disengaged.

It is an object of the present invention to provide an improved acceleration control mechanism for materials handling trucks.

It is a further object of the present invention to provide acceleration control mechanism which provides gradual acceleration of materials handling trucks.

It is a further object of the present invention to provide acceleration control mechanism for reducing the forces of accelerating trucks from rest, which are being pushed and/or switched onto nonpowered spur lines, by permitting this energy transfer to take place through a relatively long distance of tow pin movement.

It is a further object of the present invention to provide acceleration control mechanism which automatically disengages the motivating force from the materials handling truck in the event that the truck is accelerating too slowly due to overload or the like.

It is a further object of the present invention to provide acceleration control mechanism which is quickly and easily adjustable to various acceleration levels for various loads.

It is a further object of the present invention to provide an acceleration control mechanism which maintains the truck disengaged from the motivating force once it is automatically disengaged.

These and other objects of this invention will become apparent to those skilled in the art upon consideration of the accompanying specification, claims, and drawings.

Description of the drawings

Referring to the drawings, wherein like characters indicate like parts throughout the figures:

FIGURE 3 is an enlarged sectional view as seen from the line 3—3 in FIGURE 2, illustrating several positions of the mechanism;

FIGURE 4 is an enlarged sectional view as seen from the irregular line 4—4 in FIGURE 2, parts thereof removed;

FIGURE 5 is a greatly enlarged view in bottom plan of the materials handling cart having the present apparatus attached thereto, parts thereof removed;

FIGURE 6 is an enlarged sectional view as seen from the line 6—6 in FIGURE 3;

FIGURE 8 is an enlarged sectional view as seen from the line 8—8 in FIGURE 7;

FIGURE 9 is a view similar to FIGURE 7 illustrating another embodiment of the mechanism;

FIGURE 10 is a view similar to FIGURE 3 illustrating still another embodiment of the mechanism;

FIGURE 11 is a view in top plan of the mechanism illustrated in FIGURE 10, parts thereof broken away and shown in section;

FIGURE 12 is a sectional view as seen from the line 12—12 in FIGURE 10; and

FIGURE 13 is a sectional view as seen from the line 13—13 in FIGURE 10.

Description of the preferred embodiments

Figure 1:
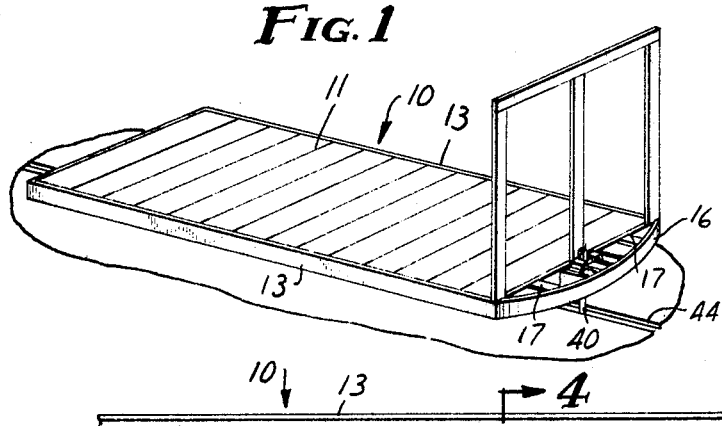
FIGURE 1 is a view in perspective of a materials handling truck attached to a drag line imbedded in the floor.
Figure 2:
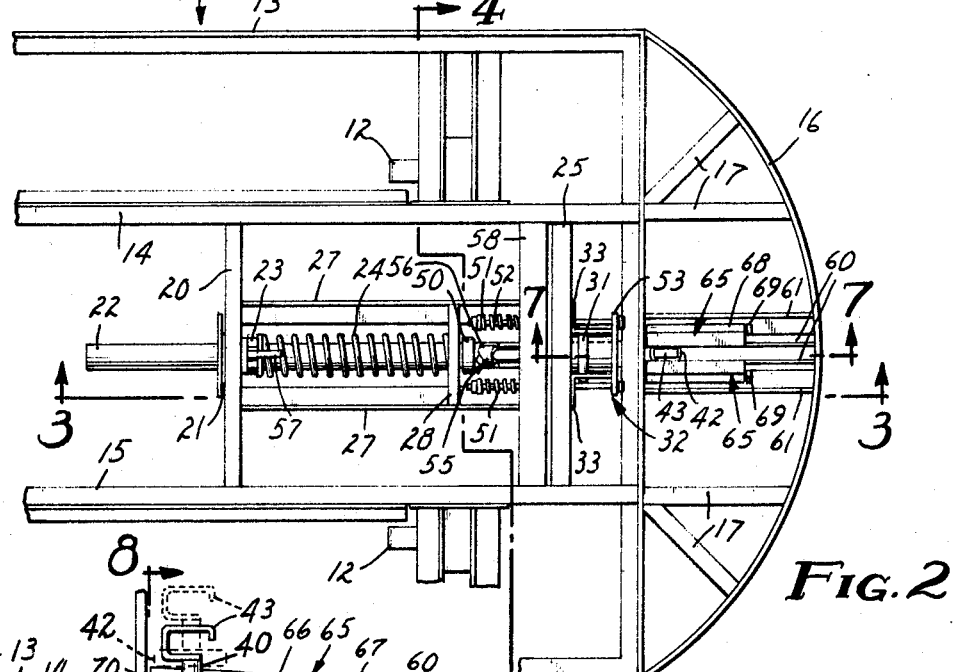
FIGURE 2 is an enlarged view in top plan of the materials handling truck having the present apparatus attached thereto, parts thereof removed.
Figure 7:
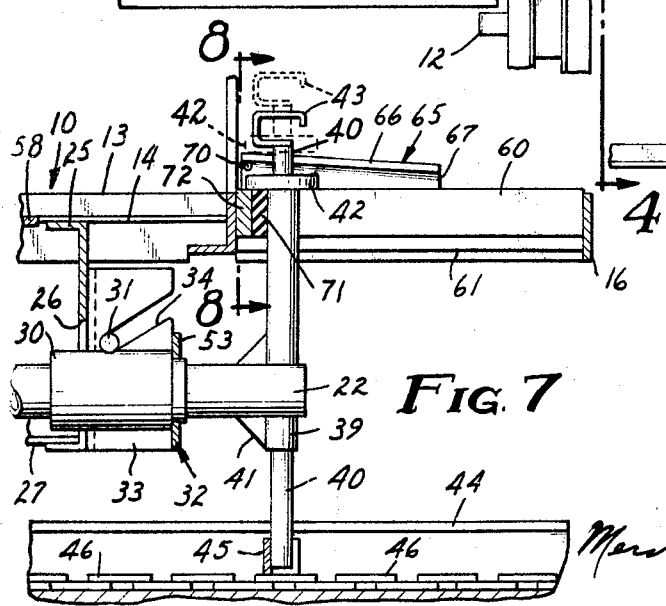
FIGURE 7 is an enlarged sectional view as seen from the line 7—7 in FIGURE 2.

In the FIGURES 1-8, the numeral 10 generally designates a materials handling truck having a bed 11 with wheels 12 attached thereto in the usual manner. A frame 13 for the bed 11 is composed of angle iron encircling the outer periphery of the bed 11 and positioned so that the bed 11 rests on the upper surface of one arm of the angle while the outer edges butt against the other arm of the angle. Two supports, 14 and 15, which extend the length of the bed 11, are approximately evenly spaced from the sides of the frame 13 and are fixedly attached at either end to the ends of the frame 13. The supports 14 and 15 are also angle irons but are positioned so that they provide a flat surface for the bed 11 to bear upon. An arcuate-shaped bumper 16 extends across the front end of the truck 10 and is fixedly attached thereto by supports 17.

A plate 20 is mounted between the centrally located supports 14 and 15 of the bed 11 midway between the ends thereof and in a plane perpendicular thereto. The upper edge of the plate 20 is bent at a 90° angle to provide a flange for increased strength of the plate 20. The sides of the plate 20 are tapered downwardly and inwardly to the lower edge which is also bent at a 90° angle to form a flange for strengthening the plate 20. The plate 20 is attached to the longitudinal supports 14 and 15 approximately vertically below the bed 11 by some means such as welding or the like. A hollow cylindrical-shaped bearing 21 is fixedly mounted in the plate 20 approximately midway between the sides thereof and positioned slightly toward the bottom. The bearing 21 is adapted to receive a relatively large shaft 22 coaxially therethrough for relative axial sliding movement and is constructed so that the shaft 22 may be pivoted slightly about a horizontal axis perpendicular to the shaft 22 and through the center of the bearing 21.

A second plate 25, similar to plate 20 except for a rectangular-shaped opening 26 positioned in the plate midway between the sides thereof and extending from the bottom edge to the mid-section of the plate 25, is attached by some means such as welding or the like between the supports 14 and 15 toward the front end of the bed 11 and vertically below the bed 11 parallel to the plate 20. Two braces 27 having an L-shaped cross section are attached between the plates 20 and 25 so that the ends butt against the plates 20 and 25 and a horizontal surface of each of the braces 27 rests on the lower bent edge of the plates 20 and 25.

A floating bearing 30, which is a hollow cylinder adapted to receive the shaft 22 therethrough for relative sliding motion, has an outer diameter slightly smaller than the width of the rectangular hole 26 so that the bearing 30 fits therein for easy horizontal and vertical movement. A bar 31 is fixedly attached approximately tangent to and on the upper surface of the bearing 30, horizontal and perpendicular to the shaft 22.

A ramp generally designated 32 for supporting the floating bearing 30 and the front end of the shaft 22 is constructed in the following manner. A pair of brackets 33, having an L-shaped cross section are mounted so that one surface of each of the brackets 33 is flat against the front surface of the plate 25. The lower edge of the brackets 33 and the plate 25 are flush and the other surface of each of the brackets 33 extends outwardly from the front surface of the plate 25 parallel and bordering the sides of the hole 26. Each of the brackets 33 has a slot 34 cut therein which is of a width sufficient to receive one end of the bar 31 therein. The slots 34 in the brackets 33 form a ramp which extends upwardly and forwardly from approximately the rear edge of the brackets 33 to the front edge thereof. The bar 31 is free to slide in the slots 34 and its normal position is in the rearmost lower extremity of the slots 34. When the bar 31 slides in the slots 34 it raises the floating bearing 30 and the forward end of the shaft 22 vertically from their normal position. The bar 31 moves with the floating bearing 30 which is in turn moved by apparatus to be described presently.

An elongated hollow cylindrical member 39, which may be a pipe or the like, is mounted vertically adjacent the front end of the shaft 22 by some means such as drilling a hole through the shaft 22 and press fitting the cylinder 39 therein. A fillet 41 is attached between the shaft 22 and the cylinder 39 at the top and bottom of the shaft 22 to add strength to the assembly. Slidably mounted within the cylinder 39 is a tow pin 40 which is a solid cylindrical elongated member. Tow pin 40 has a circular disk 42 with a diameter larger than the diameter of the cylinder 39 attached to the upper end thereof to prevent the tow pin 40 from falling entirely through the cylinder 39 and for other reasons to be explained presently. The tow pin 40 has a handle 43 fixedly attached to the upper end thereof the use of which will be explained later. The lower end of the pin 40 extends through a slot 44 in the floor and engages a driving dog 45 fixedly attached to an endless chain 46. The driving dog 45 and the endless chain 46 provide motivating force for the truck 10 through the tow pin 40.

The shaft 22 has a collar 23, removably attached thereto by some means such as a clamping arrangement, bolts, set screws, or the like, positioned in front of the bearing 21 and spaced slightly therefrom when the shaft 22 is in its normal position. A compression coil spring 24 is positioned coaxial with the shaft 22 and has the rearmost end butting against the front surface of the collar 23 with the front end butting against a flat plate 28. The flat plate 28 has a substantially centrally located hole therein with the shaft 22 passing therethrough and is mounted vertically on the supports 27 by some means such as welding or the like. Since the ends of the spring 24 butt against the flat plate 28 and the collar 23 any forward movement of the shaft 22 causes compression of the spring 24 between the collar 23 and the flat plate 28. Thus, spring 24 produces a bias on the shaft 22 tending to move it toward its normal position.

When the lower end of the tow pin 40 engages a dog 45 on the endless chain 46 the shaft 22 is suddenly pulled in a forward direction, since the inertia of the truck 10 tends to maintain it at rest. This forward movement of the shaft 22 compresses the spring 24 which produces a force on the flat plate 28 and gradually accelerates the truck 10 to the speed of the chain 46. The collar 23 is removably attached to the shaft 22 for removal and replacement of damaged parts or so the spring 24 can be quickly removed and replaced with a spring having a different force constant for maintenance or modification of the truck to operate under different conditions.

A second collar 50 fixedly attached to the shaft 22 is positioned slightly in front of the flat plate 28 when the shaft 22 is in its normal position. The collar 50 is positioned so as to butt against the rear of the floating bearing 30 when the shaft 22 has moved horizontally approximately the maximum allowable distance. Once the collar 50 butts against the bearing 30 additional forward movement of the shaft 22 causes the bar 31 to slide up the slot 34, thereby, raising the forward end of the shaft 22 and eventually disengaging the pin 40 from the dog 45. The floating bearing 30 is biased to maintain its normal position with bar 31 in the rearmost lower extremity of slots 34 by means, such as springs to be described presently, with a force sufficient to prevent forward motion of the bearing 30 when shaft 22 moves forward until bearing 30 is contacted by collar 50 the action of which is described later.

When collar 50 butts against the bearing 30 additional bias tending to prevent further forward movement of the shaft 22 is provided by means of a pair of compression springs 51. Springs 51 are mounted coaxially on a pair of shafts 52. The shafts 52 pass through holes in the plate 25 and extend through holes in a plate 53 which is parallel to plate 25 and normally positioned in abutting relationship to the front edges of the brackets 33. The forward ends of the shafts 52 have nuts threadedly engaged thereon and in abutting relationship with the front surface of the plate 53. The plate 53 has a centrally located hole therein through which the shaft 22 can slip freely. Also, the plate 53 is fixedly attached to the front end of the bearing 30 by some means such as welding or the like so that the hole therein is coaxial with the hole in the bearing 30. The shafts 52 extend rearwardly from the plate 25 a sufficient distance to accommodate the springs 51 in a partially compressed position with the forward ends thereof butting against the rear surface of the plate 25 and the rear ends thereof butting against a nut threadedly engaged on the end of each of the shafts 52. Thus, as the collar 50 moves the bearing 30 in a forward direction the plate 53 is carried with it and the shafts 52 are pulled through the holes in the plate 25 thereby compressing the springs 51. It should be understood that the size or number of the springs 51 can be varied to change the amount of bias produced on the shaft 22. Also the springs 51 and associated shafts 52 can be replaced by a means which biases the bearing 30 into its normal position and prevents movement thereof due to frictional forces caused by shaft 22 sliding therethrough when additional biasing is not required.

A hydraulic shock absorbing device generally designated 55 has a cylinder member 56, containing therein the hydraulic fluid and the movable valve assembly (not shown), and a shaft 57 attached to the valve assembly at the inner end thereof. The free end of the cylinder 56 is attached to the central portion of a horizontal support bar 58 fixedly connected to the support members 14 and 15. The free end of the shaft 57 of the shock absorber 55 is attached to the collar 23 on the shaft 22. When the shaft 22 moves in a forward direction the collar 23, which is fixedly attached thereto, moves with it forcing the shaft 57 of the shock absorber 55 into the cylinder 56. The shock absorber 55 is of the type that allows the hydraulic fluid to pass freely therearound during inward movements of the shaft 57 but provides a force restricting outward movement thereof. Thus, the shock absorber 55 creates a force in opposition to the bias of the spring 24 which causes the shaft 22 to return gradually to its normal position after forward movements thereof. This gradual return of the shaft 22 is important when the tow pin 40 is disconnected from dog 45 because it prevents damage to the various parts. It is also important to prevent the truck 10 from being accelerated to a speed greater than the speed of the dog 45 and causing a consequent chattering each time the tow pin 40 is engaged in a dog 45.

In FIGURE 9 a different embodiment of the ramp member 32 is illustrated. The various parts have been designated by the same numbers with a prime added to indicate a different embodiment. In this embodiment the slots 34' in each of the brackets 33' have been constructed with a substantially horizontal portion in communication with the slanted ramp portion and preceding the ramp portion in the path of the bar 31'. Thus, as the shaft 22' moves horizontally due to a motivating force on the pin 40' the spring 24' (not shown) is compressed providing a bias against movement of the shaft 22' and, eventually, the collar 50' (not shown) butts against the floating bearing 30' compressing the springs 51' which add to the bias provided by the spring 24'. The increased bias due to the spring 24' and the spring 51' operate on the shaft 22' during the time the bar 31' moves along the horizontal portion of the slot 34'. This increased bias provides a period during which the truck 10' is accelerated at a slightly faster rate. It should be understood that various combinations of springs and slots could be utilized to incrementally increase the acceleration in any desired number and size of increments.

A pair of elongated braces 60 having L-shaped cross sections are fixedly attached between the front end of the bed frame 13 and the bumper 16 approximately centrally and parallel to the axis of movement of the truck 10. The braces 60 are positioned so that they provide two flat surfaces in slightly spaced apart relationship. The braces 60 are spaced apart horizontally a sufficient distance to allow the cylinder 39 containing the pin 40 therein to slide freely therebetween. A bumper 71, composed of some elastic material such as rubber, is mounted in a housing 72 which is in turn mounted on the front surface of the bed frame 13 between the braces 60. The bumper 71 acts as a cushion to prevent undue mechanical stress upon the return of the cylinder 39 and the pin 40 to the normal position. The cylinder 39 and the tow pin 40 are maintained vertical by the braces 60 and any sideward movement of the pin 40 or the cylinder 39 is prevented. An additional pair of braces 61 having T-shaped cross sections are attached between the front of the bed frame 13 and the bumper 16 with the portion forming the trunk of the T on each of the braces 61 fixedly attached to the outwardly projecting arm of one of the braces 60. Thus, the braces 61 add additional support to the braces 60 to aid in preventing sideward movement of the cylinder 39 or the tow pin 40. This additional bracing may be necessary since in some instances the truck 10 may be positioned nearly perpendicular to the movement of the endless chain 46 in which case the force provided by the dog 45 on the tow pin 40 would have a great tendency to rotate the tow pin 40 about the axis of the shaft 22.

When the tow pin 40 engages a dog 45 and moves the shaft 22 forward a sufficient distance for the bar 31 to slide up the slot 34 and disengage the tow pin 40 from the dog 45 it may be desirable to maintain the tow pin 40 disengaged from the dog 45. The following apparatus is provided to accomplish this purpose. A pair of members generally designated 65 have a somewhat L-shaped cross section with the portion forming the short arm being designated 66 and the portion forming the long arm being designated 67. The members 65 are each mounted so that the portion 67 is vertical and the portion 66 is substantially horizontal. Further, the portions 66 project inwardly toward each other but the ends thereof are spaced apart a distance slightly greater than the diameter of the cylinder 39 carrying the tow pin 40. The lower end of the portion 67 is turned over to substantially form a hollow cylinder 68 at the end thereof which is utilized as a hinge member. Each member 65 is mounted in the position described by means of a bolt which passes coaxially through the cylinder 68 and is fixedly attached at one end to the front end of the bed frame 13 and at the other end to a small plate 69, seen in FIGURE 2, which is in turn fixedly attached to the brace 61.

The extreme lower inside corner of the portion 67 is square to prevent rotation of the member 65 inwardly from the normal position. This apparatus is utilized for simplicity and it should be understood that there are many other devices that could be utilized to prevent rotation inwardly from the normal position. A spring 70 has either end connected to the upper end of the portions 67 of the members 65 to provide a bias thereon tending to retain them in their normal positions. The members 65 are in their normal position when the portions 67 and 66 are vertical and horizontal respectively and the member 65 can only rotate outwardly from this normal position. In addition to the structure already described the portions 67 of the members 65 are tapered downwardly from the rearmost portion to the front portion so that the over-all surfaces of the portions 66 are not truly horizontal but form a ramp which slopes downwardly from the rear to the front of the member 65.

As the shaft 22 moves in a forward direction due to the force of the dog 45 on the tow pin 40 the disk 42 at the upper end of the tow pin 40 moves parallel to the upper edge of the braces 60 beneath the positions 66 of the members 65. As the shaft 22 begins to reach its foremost position the bar 31 slides up the slots 34 causing the front end of the shaft 22 and the tow pin 40 to begin to rise. The edges of the disk 42 are rounded so that it will easily force the members 65 arcuately outwardly as the pin 40 rises. When pin 40 finally reaches its maximum vertical position, which is the position at which the pin 40 is disengaged from the dog 45, the disk 42 is above the portions 66 of the members 65 and the members 65 have rotated inwardly back to their normal position by means of a spring 70. Thus, as the shaft 22 begins to move rearwardly under the bias of the springs 24 and 51 the pin 40 moves vertically downward until the disk 42 rests on the upper surfaces of the members 65 after which the rearward movement of the shaft 22 causes the disk 42 to slide up the ramp provided by the members 65. When the shaft 22 reaches its normal position the disk 42 is resting on the members 65 at their rearmost ends and the tow pin 40 is maintained in a vertical position high enough to prevent the lower end from engaging any of the dogs 45. Thus, the members 65 maintain the tow pin 40 disengaged from the dogs 45 once the tow pin 40 has been automatically disengaged.

The tow pin 40 can also be raised manually by means of the handle 43 so that the disk 42 rests on the upper surfaces of the members 65. It is generally desirable to have the height of the members 65 sufficient to allow the dog 45 to pass the lower end of the tow pin 40 without engagement therewith but not high enough to remove the lower end of the tow pin 40 from the slot 44 in the floor. Thus, the tow pin 40 will remain in the slot 44 and act as a guide to further movement of the truck 10. In this fashion the truck 10 can be pushed by a second truck or manually along the desired route.

In FIGURES 10 through 13 still another embodiment of the mechanism is illustrated. The various parts of this different embodiment, corresponding to parts of the first embodiment, have been designated by the same numbers and all identifying numbers have a double prime added to indicate this different embodiment. A shaft 22" is positioned below a frame 13" of a truck 10" with a tow pin 40" mounted generally vertically in a cylinder 39" at the front end thereof, as described in conjunction with the first embodiment. A hollow cylinder 80", having generally ring-shaped bearings with an inner diameter approximately equal to the diameter of the shaft 22" coaxially affixed at either end thereof, is mounted approximately coaxially on the shaft 22" so as to be in relative sliding engagement therewith. The length of the hollow cylinder 80" is shorter than the length of the shaft 22" so that the shaft 22" can slide longitudinally a substantial distance without becoming disengaged therefrom. A compression spring 24" is concentrically positioned over the shaft 22" within the hollow cylinder 80" so as to bear against the inner surface at the front end of the hollow cylinder 80". A collar 50" is attached to the shaft 22" within the hollow cylinder 80" and spaced from the rear end thereof so as to provide a second surface against which the rear end of the spring 24" can bear. The spring 24" biases the shaft 22" rearwardly so that the front end of the hollow cylinder 80" is normally adjacent the front end of the shaft 22". As the shaft 22" is pulled forwardly relative to the hollow cylinder 80", the collar 50" compresses the spring 24" whereby the shaft 22" is urged toward its initial position. A hydraulic shock absorbing device generally designated 55" operates as the hydraulic shock absorbing device 55 described in conjunction with the first embodiment except the forward end of the cylinder member 56" is attached to the hollow cylinder 80" and the rearwardly extending end of the shaft 57" is attached to the shaft 22" by a collar 23".

It should be noted that the shock absorbing device 55" is connected to the shaft 22" and cylinder 80" to provide a package which can be quickly and conveniently attached to substantially any existing materials handling truck. While the previously described embodiments of the acceleration control mechanism can be sold as a package adapted to be affixed to an existing truck, this third embodiment illustrates a simplified and more compact package. Apparatus for connecting this embodiment to a truck 10 is described below but it should be understood that various other apparatus may be used for trucks having somewhat different configurations and all such modifications come with the scope of this invention.

A pair of support members 14" and 15" are provided in the frame 13" to mount the hollow cylinder 80" thereon. The support members 14" and 15" are similar to the supports 14 and 15, illustrated in FIGURES 2 and 4, except that they are placed somewhat closer together and rotated so that the downwardly projecting portions are adjacent. A pair of plates 81" are attached to the adjacent surfaces of the supports 14" and 15" so as to extend somewhat thereabove. Each of the plates 81" has an opening therethrough above the supports 14" and 15" and an elongated sleeve bearing 82" is engaged therethrough so as to extend outwardly on either side somewhat past the supports 14" and 15". An axle 83" is engaged in the sleeve bearing 82" and extends outwardly from either end thereof a substantial distance. A pair of angle irons 84" each have a sleeve bearing fixedly attached thereto and engaged over the outwardly projecting ends of the axle 83" so that the angle irons 84" extend downwardly somewhat past the lower-most projection of the supports 14" and 15" and are free to rotate about the axle 83". The angle irons 84" present adjacent flat surfaces which are spaced apart and attached to either side of the hollow cylinder 80" by means of a pair of angle iron assemblies 85" which are affixed to the angle irons 84" and to each other by welding or the like and fixedly attached to the hollow cylinder 80″ by bolts and welding or the like. Thus, the rear end of the hollow cylinder 80″ is attached to the frame 13″ for pivotal movement about an axle 83″.

Adjacent the front end of the hollow cylinder 80″, a pair of angle irons 90″ are fixedly attached to either side, by means of bolts and welding or the like, so that the outer surfaces thereof present generally flat vertical sides. A pair of channel irons 91″ are fixedly attached to the supports 14″ and 15″ so as to extend downwardly and present a flat surface parallel with and in juxtaposition to each of the angle irons 90″. Each of the legs of a generally U-shaped member 92″ are fixedly attached to one of the channel irons 91″ so as to form a cradle between the channel irons 91″ on which the front end of the hollow cylinder 80″ normally rests. Thus, the front end of the hollow cylinder 80″ is positioned within the cradle formed by the U-shaped member 92″ so as to allow free movement thereof upwards of the U-shaped member 92. The angle irons 90″ attached to the hollow cylinder 80″ restrict the movement of the hollow cylinder 80″ to vertical movements.

A bar 31″ is fixedly attached to the rear surface of the cylinder 39″ and extends outwardly on either side thereof approximately horizontal and perpendicular to the direction of movement of the shaft 22″. The bar 31″ may be constructed so as to rotate freely within a sleeve bearing to reduce wear thereon, if it is desired. A ramp generally designated 32″ is fixedly attached to the supports 14″ and 15″, and extends downwardly therefrom to prevent substantial vertical movement of the bar 31″ and, consequently, the front end of the shaft 22″ and the tow pin 40″ during a predetermined amount of horizontal movement relative to the truck 10″. The ramp 32″ may be constructed in a variety of ways, and this embodiment consists of a pair of brackets 33″ mounted in a spaced apart relationship to allow movement of the cylinder 39″ therebetween and presenting generally downwardly directed flat surfaces 34″ against which the bar 31″ is slidably engaged. The surfaces 34″ of the brackets 33″ are generally horizontal from the rearmost end thereof to adjacent the front end thereof after which they turn sharply upwardly. Thus, the surfaces 34″ prevent substantial vertical movement of the bar 31″ as the shaft 22″ moves longitudinally the distance of the horizontal portion thereof. As the bar 31″ passes the horizontal portion of the surfaces 34″, upward vertical movement is no longer prevented and the tow pin 40″ can disengage from the dog 45″.

In the operation of the embodiment illustrated in FIGURES 10 through 13, the dog 45″ produces a horizontal force component on the tow pin 40″ tending to move the truck 10″ in a horizontal direction. Simultaneously, because the axle 83″ pivotally connecting the mounting means to the frame 13″ is situated a substantial distance above the dog 45″, there is a tendency to rotate the entire mounting means about the axle 83″, or an upward vertical force component on said tow pin. However, the bar 31″ is positioned to bear against the surface 34″ of the ramp 32″ until a predetermined amount of horizontal movement of the shaft 22″ relative to the truck 10″ occurs. If the truck 10″ has not accelerated to the speed of the dog 45″ before the bar 31″ reaches the upwardly turned portion of the surfaces 34″ or if the truck is impeded from movement by an obstacle, the tow pin 40″ moves upwardly and disengages from the dog 45″. The disc 42″ operates in conjunction with the members 65″ to maintain the tow pin 40″ disengaged from the dog 45″, as previously described in conjunction with the first embodiment.

A safety ramp 97″ is attached adjacent the front ends of the supports 14″ and 15″ to positively disconnect the tow pin 40″ from the dog 45″ under any adverse conditions. It is possible that the normal upward force tending to disengage the tow pin 40″ from the dog 45″ will not be sufficient, because of increased friction therebetween or rough spots on the surfaces thereof, in which case the tow pin 40″ will remain engaged in the dog 45″ even though the shaft 22″ has moved forward a sufficient distance so that the bar 31″ is disengaged from the ramp 32″. When this occurs the safety ramp 97″ engages the bar 31″ and forces it vertically upwardly to disengage the tow pin 40″ from the dog 45″. The safety ramp 97″ may be a single member attached to either of the supports 14″ or 15″ or, as in the present embodiment, it may be a pair of members each attached to a support 14″ and 15″ and forming a channel therebetween for the movement of the tow pin 40″.

When the tow pin 40″ is allowed to move upwardly out of engagement with a dog 45″, the forward force of the dog 45″ may suddenly be transposed into a vertically upwardly directed force. This is especially true when the upper edge of the dog 45″ and the lower edges of the tow pin 40″ becomes rounded from wear. Because of this sudden change in the direction of the force produced by the dog 45″, the tow pin 40″ may actually be thrown out of the cylinder 39″. An L-shaped member 95″ 'is attached to the frame 13″ in front of one of the members 65″ so that one of the arms thereof overlies a portion of the disc 42″ when the tow pin 40″ moves forwardly to a position in which it will disengage from the dog 45″. Thus, in the event the horizontal force of the dog 45″ is transposed into a vertically upwardly directed force, the disc 42″ will strike the L-shaped member 95″ and prevent the tow pin 40″ from becoming disengaged from the cylinder 39″.

It should be noted that in some instances it may not be necessary or desirable to disconnect the tow pin after a predetermined amount of horizontal travel thereof relative to the truck. In these instances the shaft 22 (22′ and 22″) will simply be mounted for extended longitudinal movement under the influence of springs 24, 51, 24′, 51′ or 24″ and shock absorbing devices 55, 55′ or 55″ with no vertical movement of the forward end thereof. Because of the extended longitudinal movement the initial acceleration shock can be substantially eliminated, whereas in all prior art devices the initial acceleration shock is simply reduced or delayed because of extremely limited movement of the tow pin, which limited movement is generally pivotal rather than horizontal.

Thus, I have described apparatus which gradually accelerates a materials handling truck to the speed of a drag line to which it is attached and, in the event that the acceleration is too slow due to a heavy load on the truck or other reasons, the present apparatus may automatically disconnect the tow pin from the drag line. Also, the present apparatus may include additional mechanism for maintaining the tow pin disconnected from the drag line once it is automatically disconnected. The present apparatus is simple to operate and install on a truck and has a number of variables which can be changed to compensate for various operating conditions of the truck.

While I have shown and described a specific embodiment of this invention, further modifications and improvements will occur to those skilled in the art. I desire it to be understood, therefore, that this invention is not limited to the particular forms shown and I intend to cover all modifications which do not depart from the spirit and scope of this invention.

I claim:

1. A materials handling truck having acceleration control mechanism attached thereto said mechanism comprising:

(a) a tow pin adapted to connect said truck to a drag line;

(b) means mounting said tow in approximately vertically on said truck for limited vertical and horizontal movement relative to said truck, said tow pin having a drag line engaging position and a disengaged position horizontally and vertically spaced from said engaging position;

(c) means associated with said mounting means providing vertical movement of said tow pin to said disengaged position after a predetermined amount of horizontal movement relative to said truck;

(d) first means attached to said mounting means for biasing said tow pin toward its drag line engaging position; and (e) second means attached to said associated means for substantially increasing the bias on the tow pin after a predetermined amount of horizontal movement.

2. The acceleration control mechanism as set forth in claim 1 havng in addition means associated with the tow pin for maintaining said tow pin in the disengaged position.

3. A materials handling truck having acceleration control mechanism attached thereto said mechanism comprising:

(a) a tow pin adapted to connected said truck to a drag line;

(b) movable means mounted on said truck for limited horizontal movement relative to said truck and vertical movement of at least one end thereof relative to said truck, said one end of said movable means carrying said tow pin in a vertical position therein, said movable means having a first position in which said tow pin engages said drag line and a second horizontally and vertically spaced position in which said tow pin is disengaged from said drag line;

(c) means associated with said movable means providing vertical movement of said one end of said movable means to said second position after a predetermined amount of horizontal movement thereof relative to said truck; and (d) bias means cooperating with said movable means for biasing said movable means toward said first position.

4. The acceleration control mechanism set forth in claim 3 having in addition a second means attached to the associated means for substantially increasing the bias on the movable means after a predetermined amount of horizontal movement of said movable means relative to the truck.

5. The acceleration control mechanism set forth in claim 3 having in addition a shock absorbing means attached between the truck and the movable means for retarding the horizontal movement of the movable means toward the first position.

6. A materials handling truck having acceleration control mechanis mattached thereto as set forth in claim 3 wherein said bias means has a plurality of bias levels actuated by different amounts of horizontal movement of said movable means relative to said truck.

7. The acceleration control mechanism set forth in claim 6 having in addition means associated with the tow pin for maintaining said tow pin disengaged from the drag line once the movable means moves to the second position.

8. A materials handling truck having acceleration control mechanism attached thereto, said mechanism comprising:

(a) an elongated movable member positioned beneath said truck and having a longitudinal axis normally substantially horizontal and parallel to the longitudinal axis of the truck;

(b) a stationary bearing mounting a first end of said movable member for relative axial movement, said bearing being attached to said truck for limited pivotal movement about a horizontal axis perpendicular to the longitudinal axis of said movable member;

(c) a floating bearing mounted on a second end of said movable member for relative axial movement;

(d) an upwardly inclined ramp member fixedly attached to said truck;

(e) means attached to said floating bearing cooperating with said ramp member for providing vertical movement of said floating bearing and said second end of said movable member with horizontal movement of said floating bearing;

(f) means attached to said movable member for producing horizontal movement of said floating bearing after a predetermined amount of axial horizontal movement of said movable member;

(g) tow pin means adapted to connect said truck to a drag line mounted vertically adjacent the second end of said movable member for vertical and horizontal movement therewith, said tow pin means being in a drag line engaging position when said movable member is substantially horizontal and in a disengaged position when said second end of said movable member is moved vertically upward a predetermined distance; and (h) bias means cooperating with said movable member to bias said movable member toward a position in which said tow pin remains in the drag line engaging position.

9. The acceleration control mechanism set forth in claim 8 having in addition means associated with the tow pin means for maintaining said tow pin means in a disengaged position once the second end of the movable member is moved vertically upward a sufficient distance to disengage said tow pin means from the drag line.

10. The acceleration control mechanism set forth in claim 8 having in addition a shock absorbing means cooperating with the movable member and actuating against the bias of the bias means to prevent sudden return movements of said movable member.

11. A materials handling truck having acceleration control mechanism attached thereto said mechanism comprising:

(a) a tow pin adapted to connect said truck to a drag line;

(b) elongated cylindrical means having said tow pin mounted approximately vertically adjacent one end, said cylindrical means being slidably attached to said truck for limited horizontal movement relative to said truck between a first and an extended position;

(c) spring means cooperating with said cylindrical means for providing a bias thereon urging said cylindrical means toward said first position, said bias increasing as said cylindrical means moves toward said extended position; and (d) unidirectional energy absorbing means having one end fixedly attached to said cylindrical means on which said tow pin is mounted and the other end fixedly attached relative to said truck for retarding the horizontal movement of said cylindrical means toward said first position without appreciably affecting the bias during movement in the opposite direction.

12. An acceleration control mechanism adapted to be mounted on a materials handling truck, said mechanism comprising:

(a) a tow pin adapted to connect said truck to a drag line;

(b) means mounting said tow pin approximately vertically on said truck for limited vertical and horizontal movement relative to said truck, said tow pin having a drag line engaging position and disengaged position horizontally and vertically spaced from said engaging position;

(c) said mounting means being further characterized by mounting said tow pin so that the drag line produces a vertical force component on said tow pin when the tow pin is in the drag line engaging position;

(d) means associated with said mounting means for preventing substantial vertical movement during a predetermined amount of horizontal movement relative to said truck, said associated means being further characterized by allowing vertical movement of said tow pin to said disengaged position after the predetermined amount of horizontal movement is exceeded; and (e) bias means cooperating with said movable means for biasing said movable means toward said drag line engaging position.

13. Acceleration control mechanism as set forth in claim 12 including in addition unidirectional energy-absorbing means having one end fixedly attached relative to said truck and another end fixedly attached relative to said tow pin for retarding the horizontal movement of said tow pin toward said engaging position without appreciably affecting the bias during movement in the opposite direction.

14. Acceleration control mechanism as set forth in claim 12 including means mounted adjacent said tow pin for limiting the vertical movement thereof during movement from the drag line engaging position to the disengaged position after said predetermined amount of horizontal movement.

15. Acceleration control mechanism as set forth in claim 12 wherein the movement of the tow pin to the disengaged position occurs as a result of movement of the tow pin mounting means.

16. Acceleration control mechanism as set forth in claim 12 wherein said means mounting said tow pin includes an elongated shaft mounted for longitudinal sliding movements within an elongated structure extending generally parallel to the direction of movement of said truck, said elongated structure being attached adjacent the rear end thereof to said truck for pivotal movement about a generally horizontal axis transverse to the direction of movement of said truck, and means for cradling said elongated structure adjacent the front end thereof to allow free movements of said front end upwards of the cradled position, said tow pin being in the drag line engaging position when the front end of said elongated structure is in the cradled position.

17. Acceleration control mechanism as set forth in claim 16 wherein said elongated structure contains said bias means.

References Cited

UNITED STATES PATENTS 3,015,284  1/1962  Klamp _____ 104—172

GEORGE E. A. HALVOSA, Primary Examiner